United States Patent [19]
Coleman

[11] Patent Number: 5,829,392
[45] Date of Patent: Nov. 3, 1998

[54] RESTRAINT DEVICE FOR USE WHEN BATHING AN ANIMAL

[76] Inventor: Jay Coleman, 28 Freshwater Dr., Palm Harbor, Fla. 34684

[21] Appl. No.: 819,562

[22] Filed: Mar. 14, 1997

[51] Int. Cl.⁶ ................................................. A01K 27/00
[52] U.S. Cl. ........................................ 119/795; 119/676
[58] Field of Search .................................. 119/676, 769, 119/771, 795

[56] References Cited

U.S. PATENT DOCUMENTS

| | | | |
|---|---|---|---|
| 2,438,979 | 4/1948 | Short | 119/676 |
| 5,161,486 | 11/1992 | Brown | 119/795 |
| 5,243,931 | 9/1993 | McDonough | 119/676 |
| 5,373,814 | 12/1994 | Seymour | 119/795 |
| 5,483,925 | 1/1996 | Childress | 119/795 |
| 5,551,379 | 9/1996 | Hart | 119/771 |

*Primary Examiner*—John J. Wilson
*Attorney, Agent, or Firm*—Edwin E. Greigg; Ronald E. Greigg

[57] ABSTRACT

A device for restraining a pet such as a dog or cat or any other animal while being bathed or groomed. The device includes adjustable straps connected at one end to suitable suction cups which are secured to a surface when used. The opposite end of the straps are secured to a swivel snaphook such that the swivel snaphook is substantially at a mid-point between the suction cups. The straps can be held in place at the connections by use of strap adjusters so that the length of the device between the suction cups can be adjusted.

6 Claims, 6 Drawing Sheets

RESTRAINT DEVICE FOR USE WHEN BATHING AN ANIMAL

FIELD OF THE INVENTION

The invention relates to an improved device for restraining animals such as a dog or cat in a bathtub, stand-up shower, sink or to any smooth surface such as a counter top in which the animal is being bathed or groomed.

BACKGROUND OF THE INVENTION

Heretofore different types of combination of straps, buckles, holders, etc. have been used to restrain an animal for different purposes during treatment, bathing, transporting, etc. Some known devices are reflected in U.S. Pat. Nos. are 2,438,979; 2,491,951; 4,252,084; 4,827,876; 4,834,027; 4,899,694; 4,958,597; and 5,551,379. Some of the patents teach restraint means for bathing an animal, for restraining an animal in a specific area and for transporting an animal in an open bed vehicle to prevent the animal from jumping from the vehicle.

OBJECTS OF THE INVENTION

This invention is designed mainly for the purpose of restraining an animal during bathing or grooming the animal.

It is therefore an object of the invention to provide a very easy to use, inexpensive and extremely versatile device for restraining animals while they are being bathed or groomed.

Another object is to provide an effective device for restraining animals in any size or shape of bathing medium while being bathed or groomed.

Still another object is to provide an effective device for restraining animals in almost any type of stand-up type shower while being bathed or groomed.

Yet another object is to provide an effective device for restraining animals in almost any type of sink or laundry tub while being bathed or groomed.

While still another object is to provide an effective device for restraining animals for the previously stated purposes that is easily adjustable to suit animals of different sizes.

While yet another object is to provide an effective device for restraining animals for the purposes stated previously that can be quickly and easily installed for use in a bathtub or stand-up shower or on any smooth surface, such as a counter top.

While another object is to provide a restraining device for the previously stated purposes that can be easily used and then stored in a small space.

The invention will be better understood and further objects and advantages thereof will become more apparent from the ensuing detailed description of preferred embodiments taken in conjunction with the drawings.

DESCRIPTION OF THE PREFERRED EMBODIMENT

Figure 1:
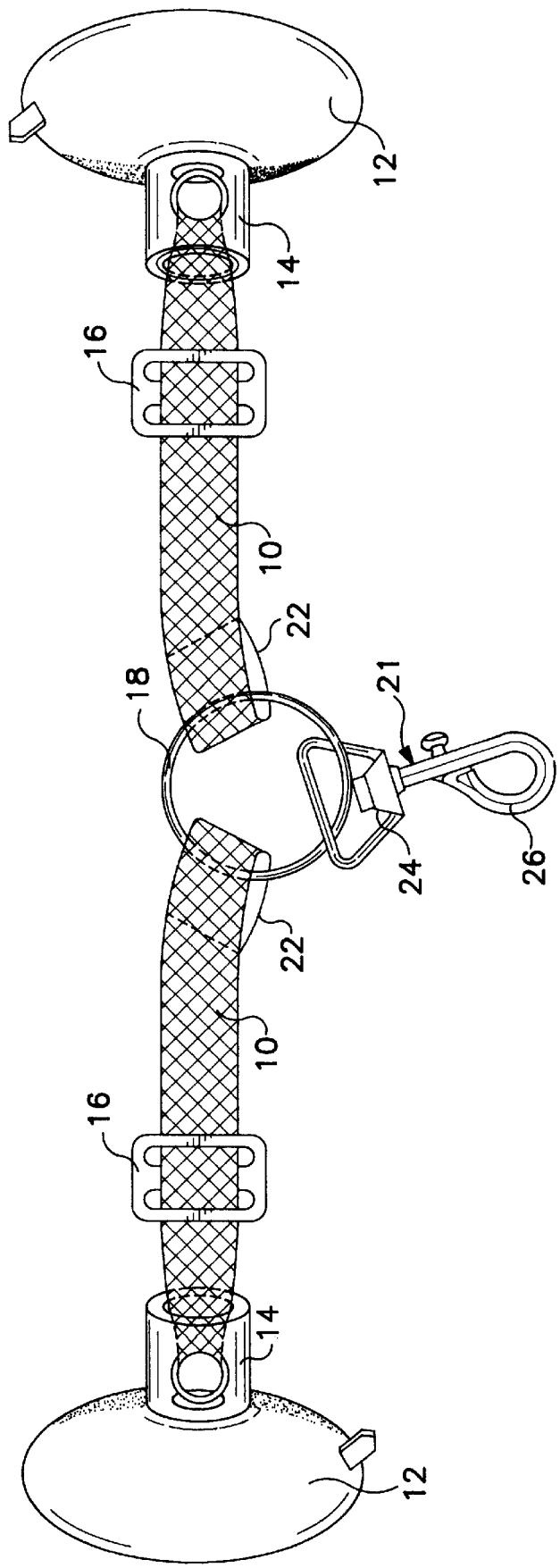
FIG. 1 is a perspective view of an animal restraint device for a small type animal.
Figure 2:
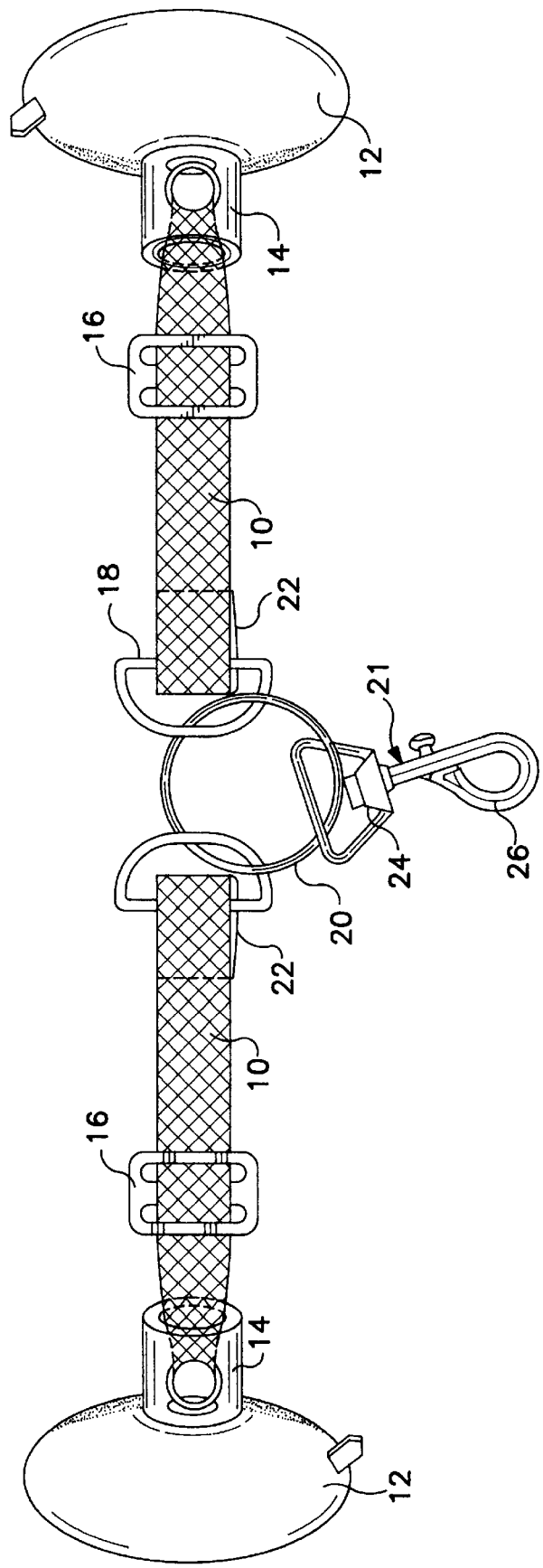
FIGS. 2 and 3 illustrate a modification of the device shown in FIG. 1.

Now referring to the drawings in which like reference characters represent like parts throughout the drawings there is shown in FIG. 1 an animal restraining device for restraining a small type dog or cat for instance. As shown, the device includes a pair of straps 10 each of which are secured at one end to an upper surface of a suction cup 12. As shown, each end of the straps is looped through an eye 14 on the upper surface of the suction cup. The strap is folded back alongside itself and secured in place by a strap adjuster 16. The opposite end of each strap is secured to a metal ring 18 which can be of any shape and size so long as the ring serves the purpose of holding one end of each strap to a swivel snaphook 21. The ends 22 of the straps can be folded back alongside its surface and secured in place or held in place by rivets or any other suitable means. A swivel end 24 of a snaphook 26 is secured to the ring 18. In FIG. 2, the device is shown with interlocking rings 18, 20, however, only one ring as shown in FIG. 1 could be used by which the ends of the strap and the swivel end of the snaphook would be secured to the same ring or other means. As shown in FIG. 2, each inner end of the straps has a ring 18 which is interlocked with ring 20 which is secured to the swivel snaphook.

Figure 3:
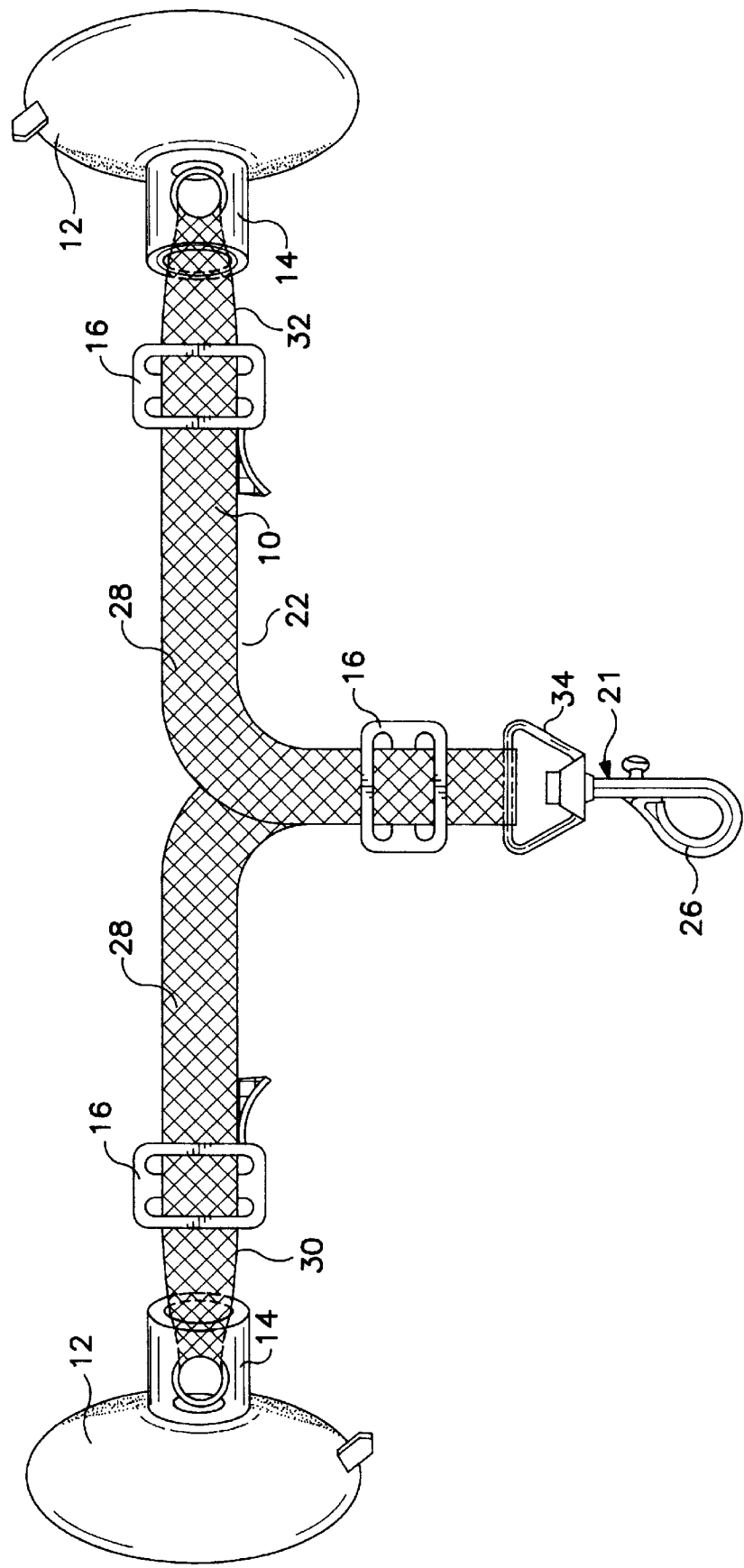

FIG. 3 illustrates a modification of the restraining device shown in FIG. 1. The device shown in FIG. 3 includes a single strap 28 with opposite ends 30, 32 secured to an upper end of a suction cup 12 and held in place by strap adjusters 16 after the ends of the strap are folded back alongside itself. The single strap is fed through a swivel end loop 34 of a swivel snaphook 26. The single piece strap could be made in two pieces with one end of each strap secured to the upper surface of the suction cup and the opposite ends of each strap would be secured to the ring end of the snaphook. The strap adjuster could be used to secure the one piece strap near the end connected to the snaphook or the strap adjuster could be used to secure each separate end of two straps to the end of the snaphook.

In carrying out the invention, the suction cups 12 of the restraining device comprise two 3¼" rubber suction cups such as are produced by Suction Cups, Inc. The suction cups have been tested to hold over 100 lbs. each. They are connected to at least one ¾" wide nylon strap, the strap being looped through a 0.435" diameter side pilot hole on the top nub of the suction cup; any other suitable ring or eye means can be used. The end of the strap is then secured back to itself with a ¾" plastic strap adjuster such as supplied by A-Plus Products, Inc. A ¾" zinc plated swivel snaphook such as supplied by A-Plus Products is affixed to the center section of the strap by looping the strap through the ¾" loop on the snaphook and is locked into position on the strap by securing the looped strap back to itself with a ¾ plastic strap adjuster, thus creating a harness that can be easily adjusted to suit different sizes of animals from both ends of the harness at their point of connection to the suction cups. As shown in FIG. 1, the inner ends of the straps would be secured to a single ring which is then secured to the ring end of the snaphook.

In use of the restraining device shown in FIGS. 1, 2 and 3, the strap or straps are secured to the suction cups and the swivel snaphook. The suction cups can then be secured to an inside smooth surface of a bathtub, a shower wall, a sink or a counter top. The animal to be restrained is then secured by a collar to the snaphook and would be restrained. Since the middle of the one strap or the inner ends of the two straps are secured with the snaphook at a mid-point, the animal will be restrained evenly between the suction cups. The restraining device of FIGS. 1, 2 and 3 should be used for restraining a small type animal such as a dog up to about 60 pounds.

Figure 4:
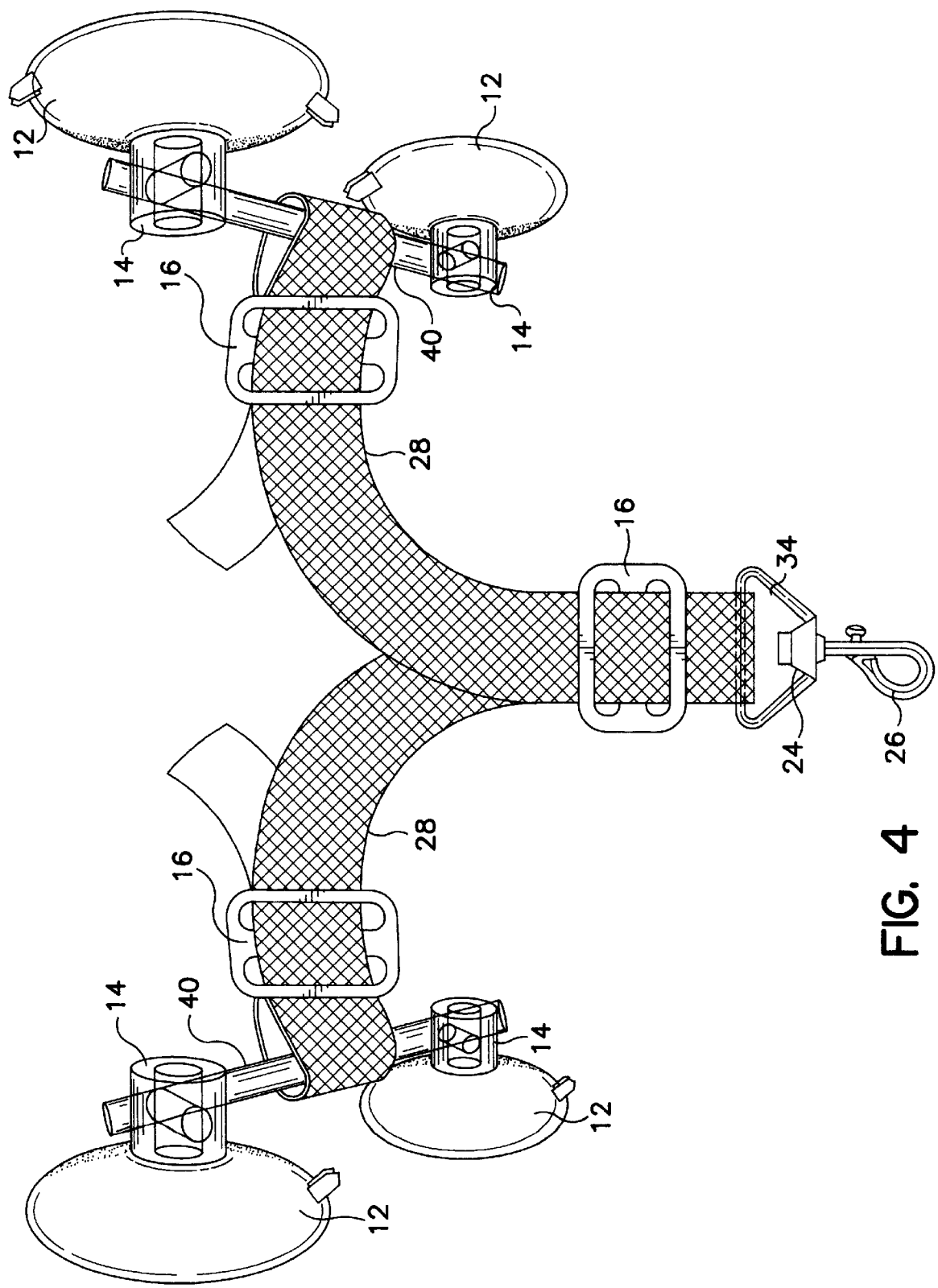
FIG. 4 is a modification of the device shown in FIG. 3 for restraining large type animals.

FIG. 4 is directed to a restraining device for securing a larger dog to a tub, shower, wall, or counter top surface. The restraining device of FIG. 4 is similar to the device of FIG. 3 except that the outer ends of the strap are secured to a cross piece 40 secured between two spaced suction cups at each end of the strap. The ends of the strap are looped back along its own surface and secured to the cross piece by the strap adjusters. The cross piece should be of a rigid material so that the suction cups would not be pulled toward each other as by a flexible piece. However, if one desired to use a flexible material such as a piece of the strap material, this would also serve the purpose of using two spaced suction cups at each end of the restraining strap.

Figure 5:
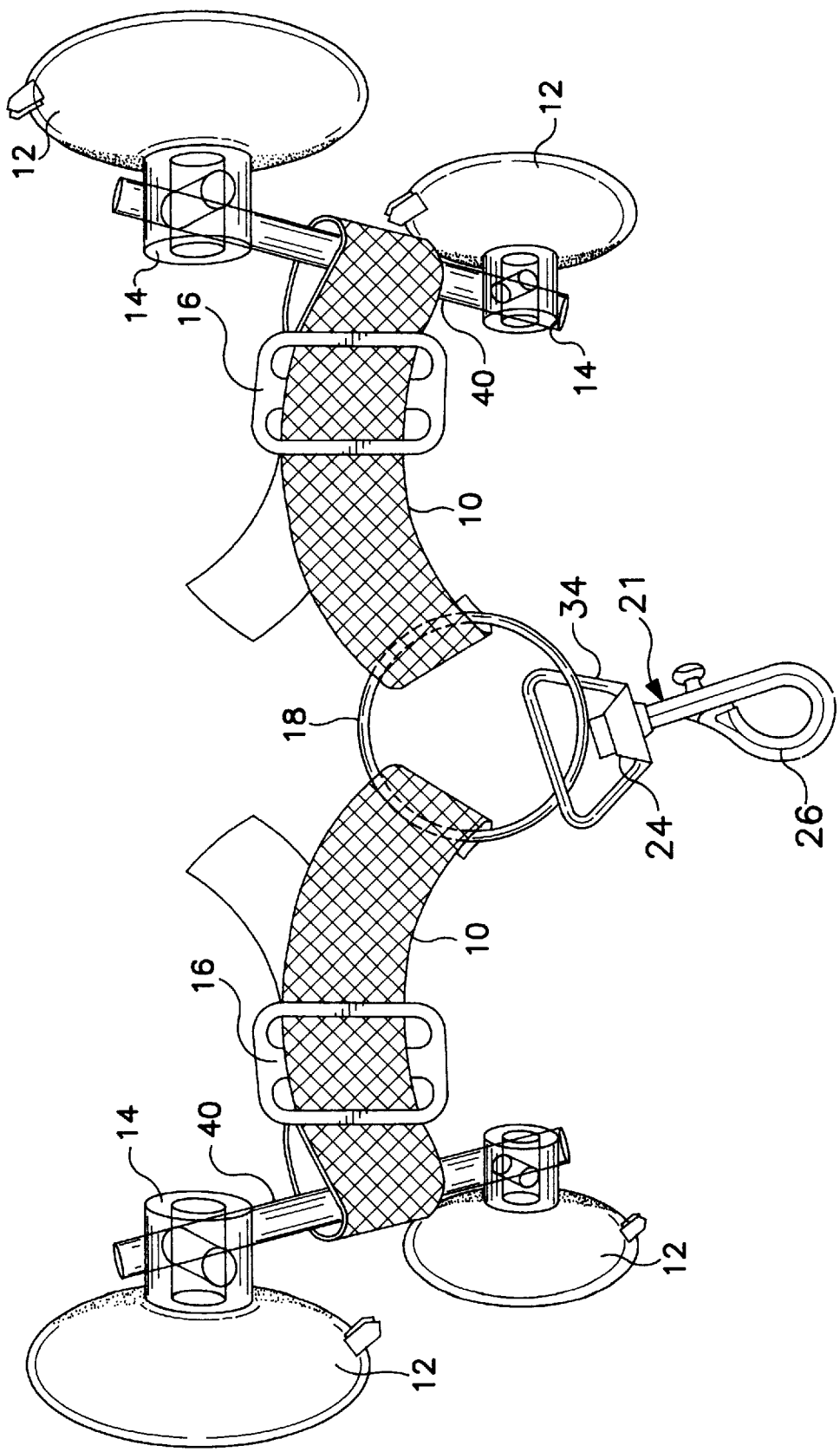
FIGS. 5 and 6 are modifications of the device shown in FIG. 4.
Figure 6:
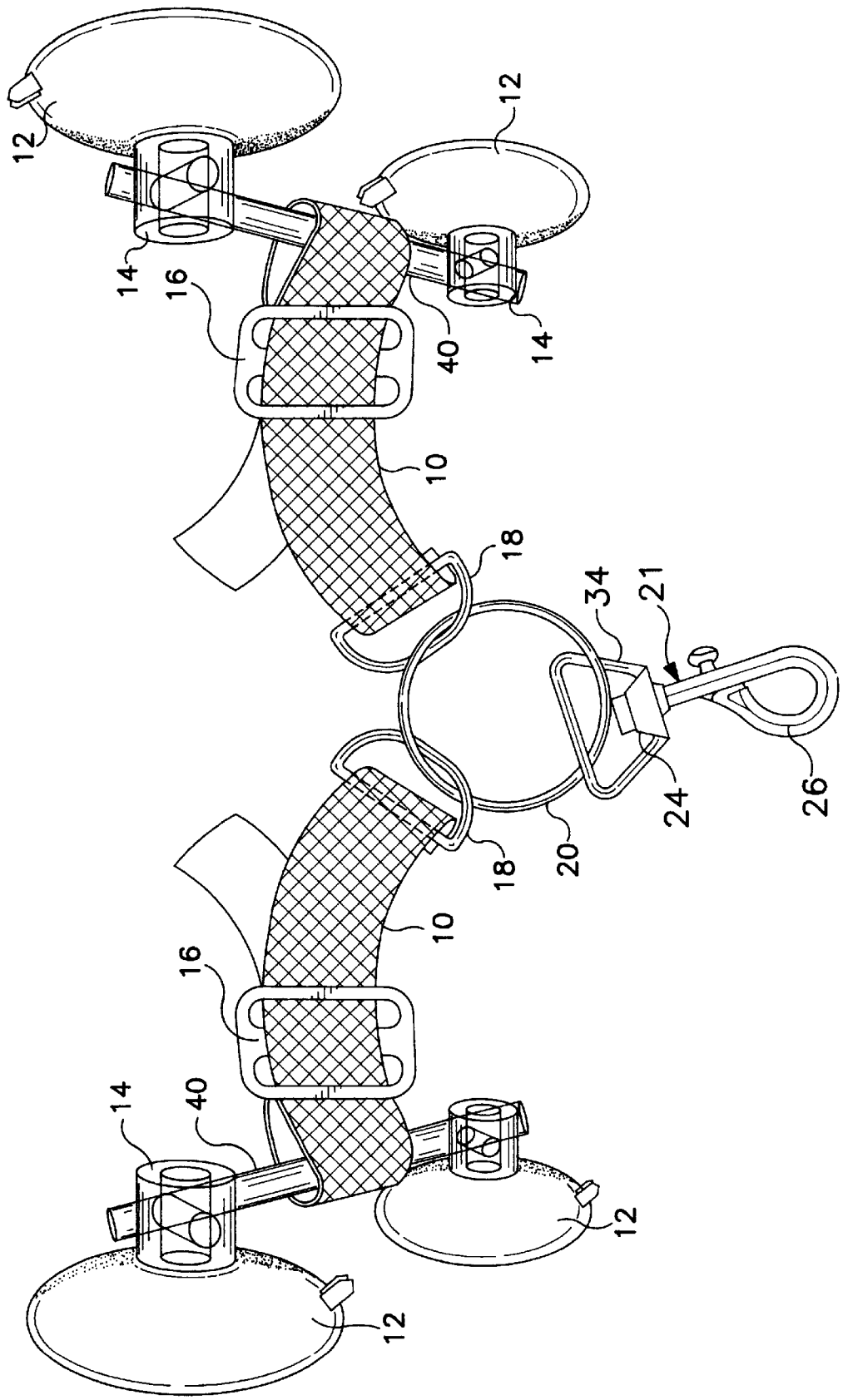

FIGS. 5 and 6 are modifications of FIGS. 1 and 2 which are shown with a pair of suction cups at each outer end of the two straps. Thus, it is seen that the strap retainer can be made with one suction cup or a pair of suction clips at each end of the strap.

Each of the restraining devices shown in FIGS. 1–6 can be adjusted at their suction cup ends so that the snaphook can be positioned at a mid-point between the suction cups or could be closer to one suction cup than to the other. In the device shown in FIGS. 4–6, the ends of the straps can be moved between the two suction cups for a slight side-wise adjustment.

In carrying out the invention, the straps may be of any preferred material; for example, nylon of about one and one-half inches wide. The length of the strap obviously must be of sufficient length that it will fit from one side of a structure to another such as in use in a bath tub or shower. The length could be shorter if used on a counter surface or any similar surface. The length of the strap is to be adapted to the spacing necessary to secure the suction cups to opposing or the same surfaces. It has been determined that suction cups of about three and one fourth inches are sufficient to secure the device for use by a dog. As set forth above, single suction cups on opposing ends of the strap can be used for a small dog, whereas two suction cups are to be used on opposing ends of the strap for a large sized dog. In use of the device the straps are adjusted for length depending on the surface spacing.

If the same flat surface is used, the straps could be shorter. The length of the straps depend on the situation for restraining an animal.

The upper surface of the suction cup to which the at least one strap ends are connected can be of any suitable shape as long as the ends can be connected thereto.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A device for restraining an animal, which includes,
   a pair of first suction cup means and a pair of second suction cup means,
   one strap means having first and second ends,
   said one strap means is connected to a swivel end of a snap hook means at about a midpoint between said first and second ends of said one strap means,
   a first suction cup securing means is formed by a first rigid spacer means for connecting said pair of first suction cup means to each other in a spaced relationship,
   a second suction cup securing means is formed by a second rigid spacer means for connecting said pair of second suction cup means to each other in a spaced relationship,
   said first end of said one strap means is connected to said first spacer means that connects said first pair of suction cups in a spaced relationship, and
   said second end of said one strap means is connected to said second spacer means that connects said pair of second suction cup means to each other.

2. A device for restraining an animal as set forth in claim 1, in which said one strap means includes strap adjusters for securing said first and second ends of said one strap means to said first and second rigid spacer means.

3. A device for restraining an animal in a desired location as set forth in claim 1, in which each suction cup means is rotatably secured onto said first and second rigid spacer means.

4. A device for restraining an animal in a desired position as set forth in claim 1, in which said rigid spacer means includes retention means designed to retain each said suction cup in place on said rigid spacer means.

5. A device for restraining an animal in a desired position as set forth in claim 4, in which said retention means comprises an enlarged end portion at each end of said rigid spacer means.

6. A device for restraining an animal in a desired position as set forth in claim 5, in which said suction cup includes a throughbore extending through an extremity of a body of said suction cup opposite from the suction cup itself, which throughbore is arranged to be impaled by an end of said rigid spacer means so as to lock said suction cup in place on said rigid spacer means.

\* \* \* \* \*

UNITED STATES PATENT AND TRADEMARK OFFICE
CERTIFICATE OF CORRECTION

PATENT NO. : 5,929,392
DATED : July 27, 1999
INVENTOR(S) : Sabato et al.

It is certified that error appears in the above-identified patent and that said Letters Patent is hereby corrected as shown below:

On the title page, after item [62] insert the following:

--[30]    Foreign Application Priority Data
   Mar. 14, 1995   [JP]   Japan ..........7-054425 --.

Signed and Sealed this

Fourth Day of April, 2000

Attest:

Q. TODD DICKINSON

Attesting Officer

Director of Patents and Trademarks